(12) United States Patent
Arrighi

(10) Patent No.: US 6,467,144 B1
(45) Date of Patent: Oct. 22, 2002

(54) MULTIFUNCTION INSERT PRESS

(76) Inventor: Claudio Arrighi, 27, Via Vicinale Macchia-Fraz. Marina, 54036 Carrara (Massa Carrara) (IT)

( * ) Notice: Subject to any disclaimer, the term of this patent is extended or adjusted under 35 U.S.C. 154(b) by 0 days.

(21) Appl. No.: 09/806,156

(22) PCT Filed: Sep. 27, 1999

(86) PCT No.: PCT/IT99/00304

§ 371 (c)(1),
(2), (4) Date: Mar. 28, 2001

(87) PCT Pub. No.: WO00/18539

PCT Pub. Date: Apr. 6, 2000

(30) Foreign Application Priority Data

Sep. 28, 1998 (IT) .......................... MS98A0008

(51) Int. Cl.[7] .................. B23Q 3/155; B21D 37/04; B30B 15/00; B23P 19/00
(52) U.S. Cl. ................... 29/33 K; 29/281.5; 72/420; 72/442; 100/299 R; 483/28
(58) Field of Search ................... 29/33 K, 33 J, 29/251, 281.5, 283, 56.6, 35.5; 72/442, 446, 448, 405.1, 420, 482.91; 100/53, 299 R, 918, 224; 483/28, 29

(56) References Cited

U.S. PATENT DOCUMENTS

| 3,693,386 A | * | 9/1972 | Hedberg ...................... 72/20.5 |
| 3,818,748 A | | 6/1974 | Smit |
| 3,881,606 A | * | 5/1975 | Swinehart ................ 198/750.7 |
| 3,934,777 A | | 1/1976 | Kramer et al. |
| 3,942,431 A | * | 3/1976 | Goff ........................... 100/224 |
| 3,999,477 A | * | 12/1976 | Good et al. ............. 100/269.16 |
| 4,587,830 A | * | 5/1986 | Mills ........................... 72/442 |
| 4,901,427 A | * | 2/1990 | Sakamoto et al. ............ 483/29 |
| 5,040,404 A | * | 8/1991 | Henderson et al. ......... 100/918 |
| 5,458,057 A | * | 10/1995 | Arens ..................... 100/229 R |
| 5,582,005 A | * | 12/1996 | Wunderlich et al. .......... 60/275 |
| 5,676,014 A | * | 10/1997 | Sanford ..................... 72/405.1 |

FOREIGN PATENT DOCUMENTS

| DE | 29 04 935 | | 8/1980 | |
| JP | 4021175031 A | * | 7/1990 | .............. 72/482.91 |
| JP | 404091828 A | * | 3/1992 | ................. 29/35.5 |

* cited by examiner

Primary Examiner—William Briggs
(74) Attorney, Agent, or Firm—Browdy and Neimark, P.L.L.C.

(57) ABSTRACT

A press for the installation of inserts on thin metallic or plastic rolled sections by cold plastic deformation of the rolled sections, comprising a structure (2, 3) bearing a punch (8) and an insert-bearing turret anvil (15) arranged in a substantially axial alignment in a working position thereof, and actuator means (4, 6, 7) within the structure for controlling the sliding of the punch toward the turret anvil. The turret anvil is mounted on a carriage (14) sliding with respect to the structure between the working position, wherein the carriage is completely inserted in the structure, and a loading position, wherein the carriage protrudes therefrom. The distance between the punch and the turret anvil is sufficient to allow the interposition of the thin metallic or plastic rolled sections therebetween, without the risk of accident for the operator and making easier the press loading operations.

11 Claims, 6 Drawing Sheets

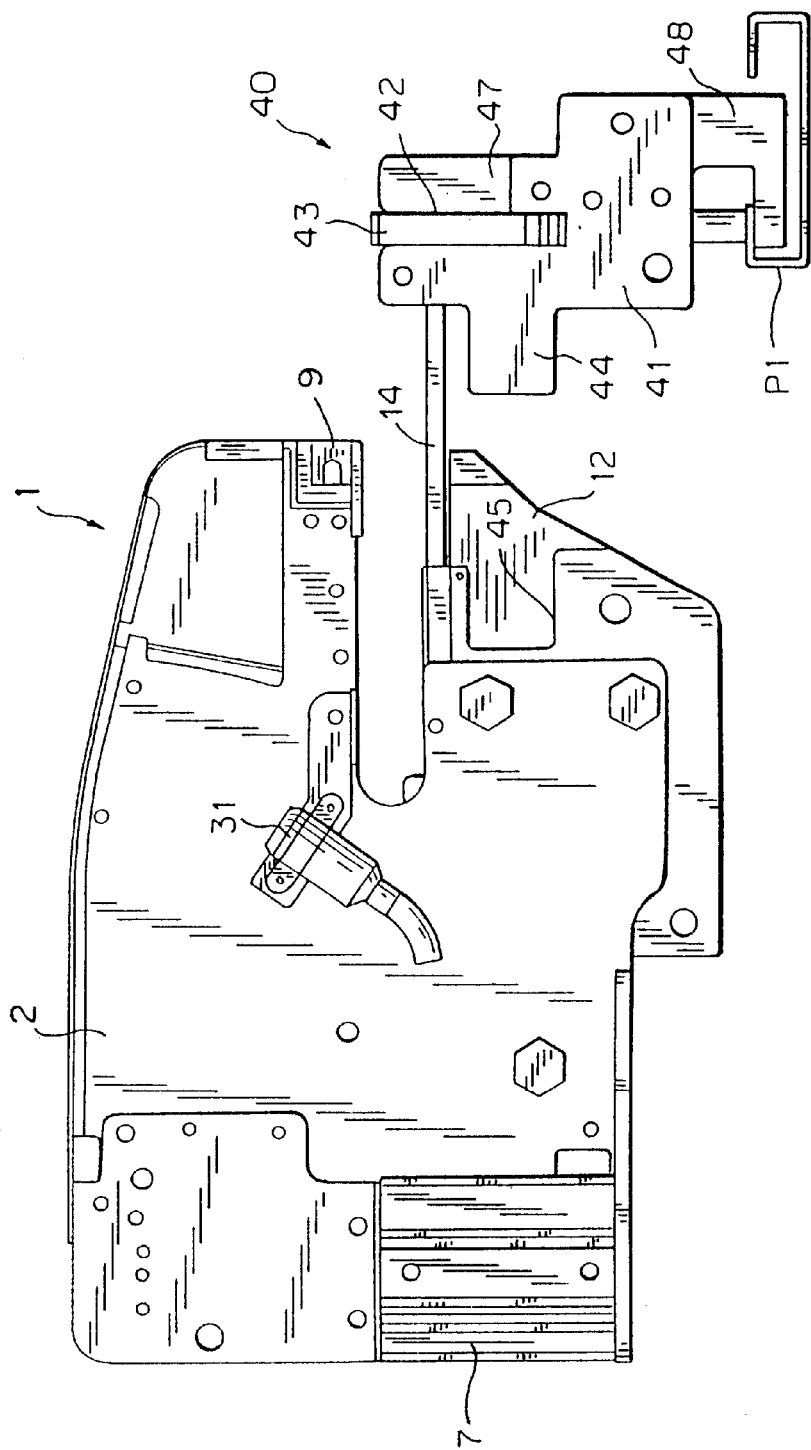

MULTIFUNCTION INSERT PRESS

REFERENCE TO RELATED APPLICATIONS

The present application is the national stage under 35 U.S.C. 371 of international application PCT/IT99/00304, filed Sep. 27, 1999, which designated the United States, and which international application was not published in the English language.

FIELD OF THE INVENTION

The present invention relates to a multipurpose insert press destined to be used in all those fields in which there is a need to assemble manufactured articles constituted by thin plastic or metallic rolled sections clamped by means of screws and threaded inserts, and to carry out various machinings related to this activity or entailed therefrom.

DESCRIPTION OF THE STATE OF THE ART

In the field of the metallic or plastic carpentry that employs thin rolled sections to perform assemblies requiring a frequent disassembling and reassembling, it being impossible, due to their scanty thickness, to thread those rolled sections in a lasting and reliable manner, threaded members are installed thereon forming the seats inside which the connection screws are engaged.

Those installed threaded members are commonly called "inserts", and in the present, description they shall be hereinafter referred to as such. Some types of threaded inserts are secured to the rolled sections by cold plastic deformation of the rolled section obtained pressing the insert against the rolled section with a force that is sufficient to obtain local pressures, at the points of contact, higher than the elastic limit of the rolled section itself.

The apparatuses needed to obtain these forces are generically called "insert presses". Due to the particular kind of task, the insert presses require specific geometrical characteristics, as they must be capable of reaching and of forcing the inserts even in positions difficult of access, as e.g., near laps.

The insert presses of known type essentially comprise a resting structure for a turret anvil, onto which one or more seats are formed for housing an insert, and a punch overlooking the turret anvil and coaxially sliding thereto with respect to said structure by the action of actuator means thereon and driven in a hydraulic or in a pneumatic way. A rolled section is manually positioned by an operator between the insert, carried by the turret anvil, and the punch that down-strokes exerting variable forces from 500 to 7000 Kg, according to the type of insert and of materials, causing the local deformation of the rolled section and the engagement of the insert thereon. In other cases the rolled section is directly laid onto the lower turret anvil, whereas the insert is placed above the rolled section. In most cases the positioning of the insert is manual, and anyhow, even in those cases in which an automatic insert magazine is available, the rolled section still needs to be manually positioned and held in place by an operator.

Most commercially available apparatuses used for this task have a relatively wide port between the turret anvil and the punch, in the order of several centimeters, to ease the positioning of the insert and of the rolled section prior to the pressing action. In many instances this port is too narrow to allow a good visibility of the working site, making the positioning of the insert and of the rolled section difficult. However, it is sufficiently wide to allow the accidental insertion of a hand or arm, thus exposing the operator to a serious risk of accidents. In order to avert this risk, some types of presses are provided with checking systems of the acting forces, that are kept very low until the punch has descended below a safety height.

Moreover, on this type of presses punches are mounted that, due to their length, can develop a thrusting action merely at their axes. Thus, even in the case of revolving turret anvils, provided with several seats housing the inserts, there is only a single working position of the turret anvil, and anyhow the insert seat has to be placed at this position, thus making it difficult to reach the installation spots of the insert located near the apexes of a trihedron or of laps, so that the insert is often applied prior to the bending.

Another drawback of the insert presses of known type lies in the fact that they strictly serve a single purpose, i.e. are destined to the mere insert installation, without foreseeing the possibility of different functions, like blanking, drawing, forming, riveting and clinching. Quite often this steps are concomitant to the insert installation, and, according to the known art, require the availability of specific apparatuses, a factor that negatively affects the capital and labor costs, and the required availability of suitable spaces for the installation and the use of such apparatuses.

SUMMARY OF THE INVENTION

The object of the present invention is to provide a press for the installation of inserts onto thin plastic or metallic rolled sections by a cold plastic deformation thereof, its use not entailing accident risks for the operator, and in which the insert and the rolled section loading and positioning steps are simpler than that of the insert presses of known type.

Another object of the present invention is to provide an insert press of the above-mentioned type configured so as to carry out a series of other machinings related to the step of insert installation or consequent thereto, and to meet specific requirements of these machinings without reducing the working safety of the operator.

A further object of the present invention to provide an insert press of the above-mentioned type, having a high operative versatility in order to allow on the one hand the insert installation even on spots of the sheet metal workpiece that are difficult of access, on the other hand allowing the optimal adjustment of the main operative parameters under any working condition.

The above objects are attained with the insert press according to the present invention, whose essential characteristics are set forth in the annexed claim 1.

Further characteristics and advantages of the insert press according to the present invention will be hereinafter apparent from the description of an embodiment thereof, given by way of example and not for limitative purposes, with reference to the annexed drawings.

SHORT DESCRIPTION OF THE DRAWINGS

In the drawings:

FIG. 6 is a side view of the insert press according to the invention with the carriage extracted and provided of attachment for installing inserts onto C-shaped workpieces;

DESCRIPTION OF THE PREFERRED EMBODIMENT

Figure 1:
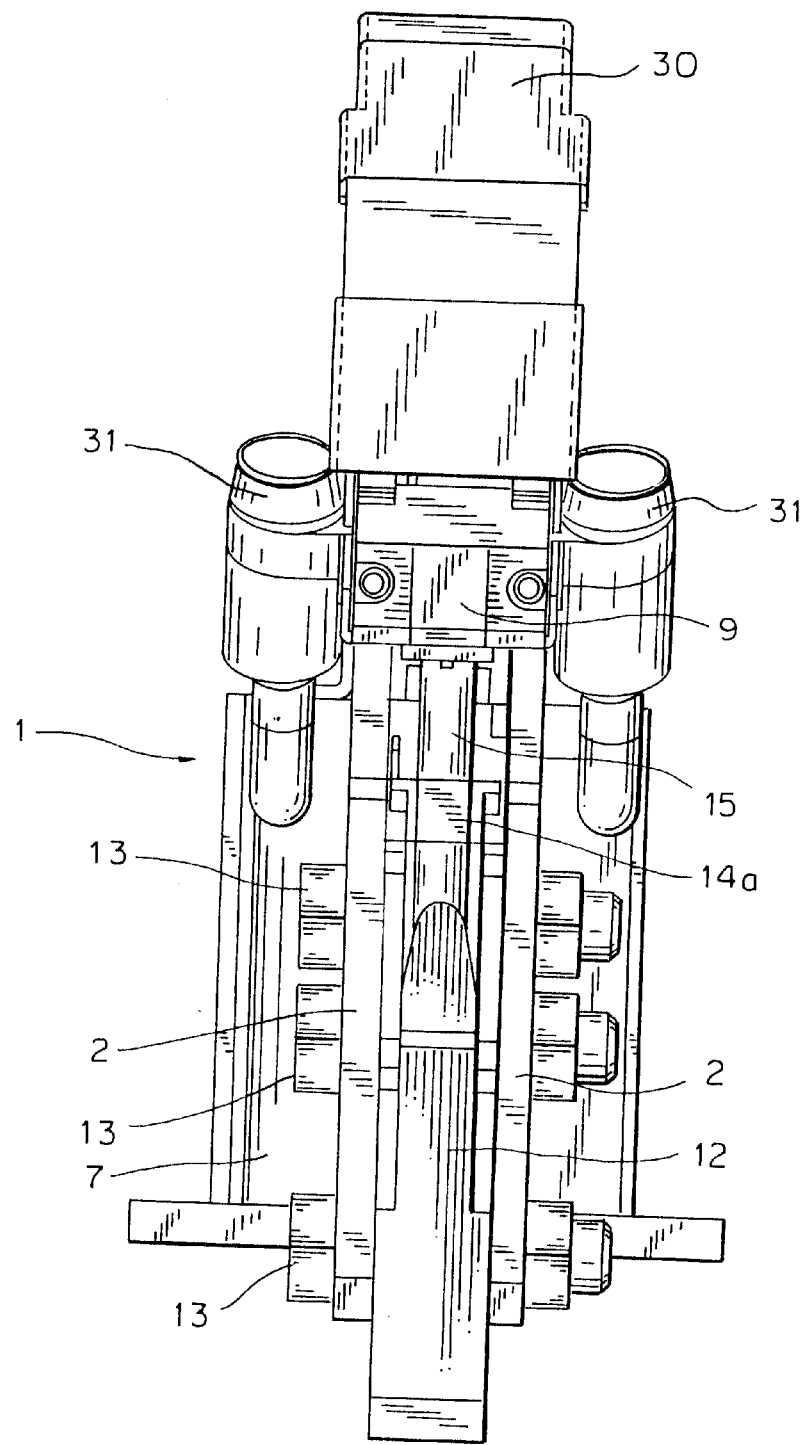
FIG. 1 is a front view of the insert press according to the present invention.
Figure 2:
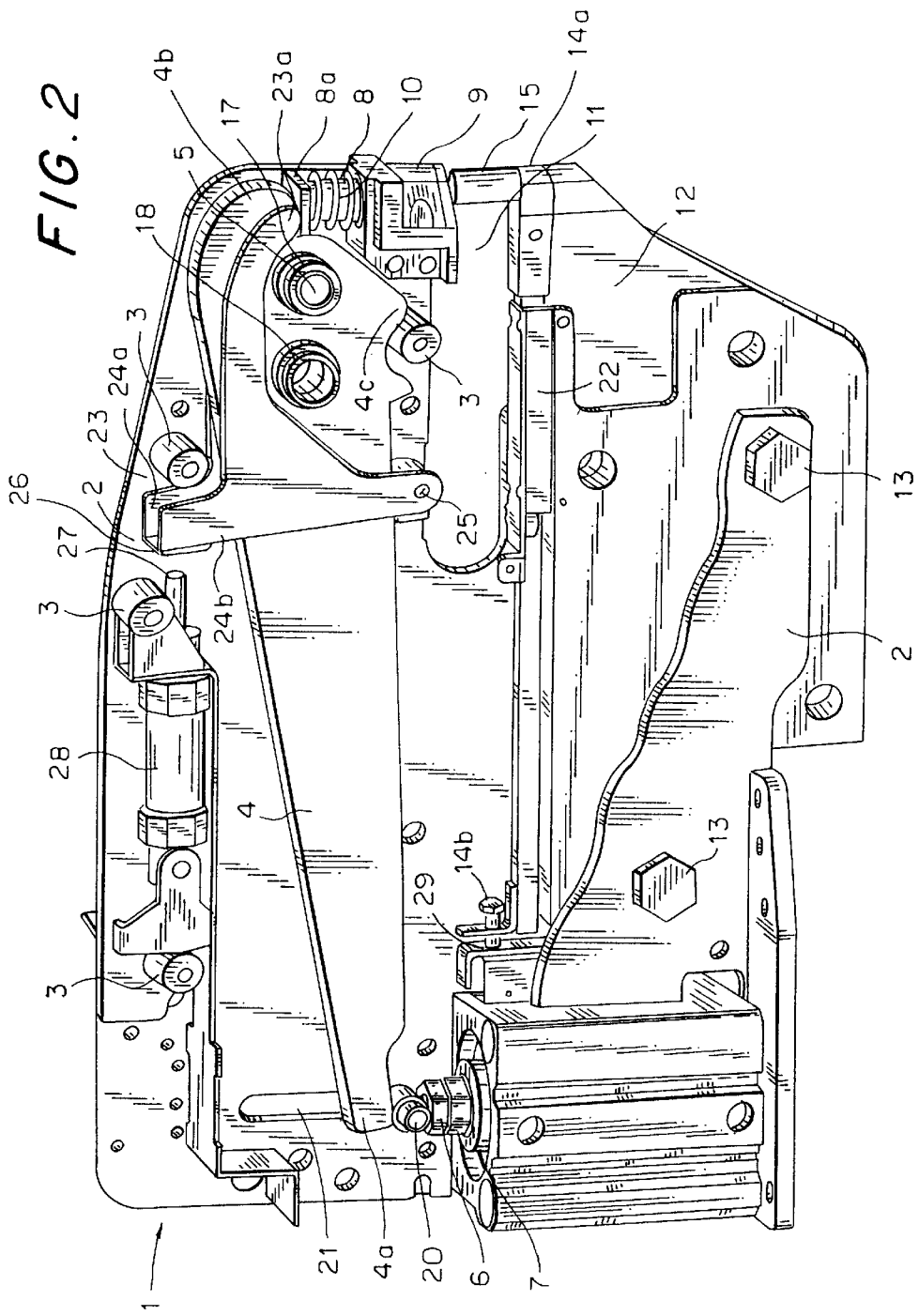
FIG. 2 is a perspective side view of the insert press of FIG. 1, in which a side frame has been removed for ease of illustration.

With reference to FIGS. 1 and 2, overall the insert press according to the present invention has been indicated with 1. It consists of a metallic structure formed by two flat plates 2, or side frames, parallel therebetween, vertically trimmed and joined by a series of spacers 3. In the upper portion of this structure, between the two flat plates 2, a lever 4 provided with an engagement seat 17 for a transverse pin 5 is located, supported by the two plates 2 and-functioning as pivot for the lever. One end 4a of lever 4 cooperates with a rod 6 of a piston 7, shown in FIG. 2 and pneumatically or hydraulically actuated in a known way not shown. In particular, between end 4a of lever 4 and the end of rod 6 a crosstie 20 is interposed, sliding within a pair of vertical slots 21 parallel to the rod axis. Thus, the excursion of end 4a of lever 4 takes place on the crosstie, thereby avoiding any damaging of the actuator device. The other end 4b of lever 4 cooperates with a punch 8, slidingly placed inside a bush 9 integral to plates 2. Punch 8 has a head 8a, onto which end 4b of lever 4 operates, and a spring 10 is located coaxially to punch 8 between head 8a thereof and bush 9 in order to ensure the spring back of the punch to the rest position at the end of the pressing action of lever 4.

Figure 3:
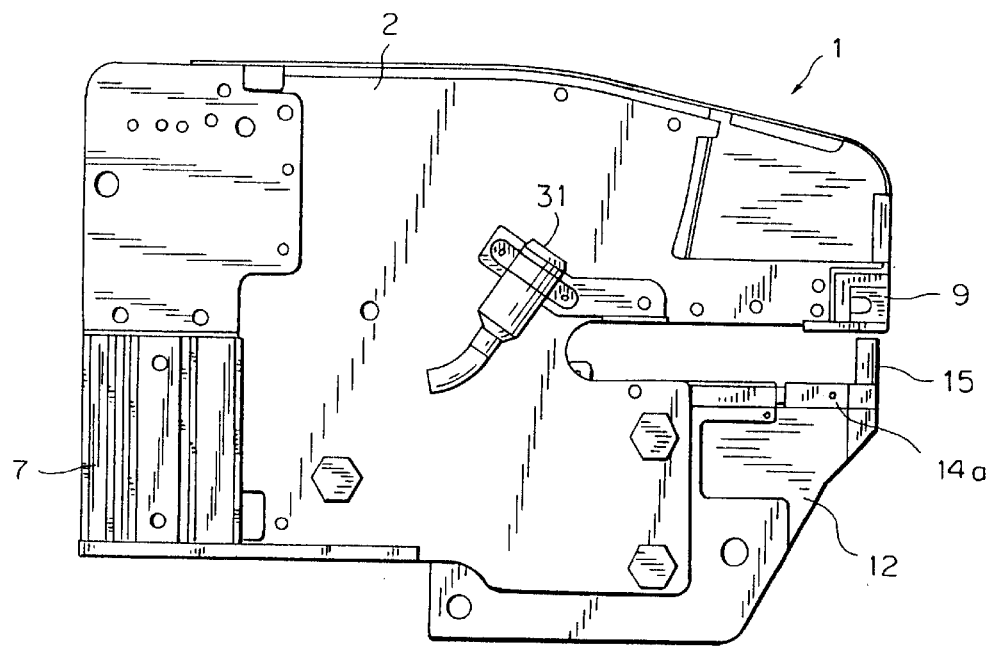
FIGS. 3 and 4 are side views of the press according to the invention with the carriage retracted and extracted, respectively.
Figure 4:
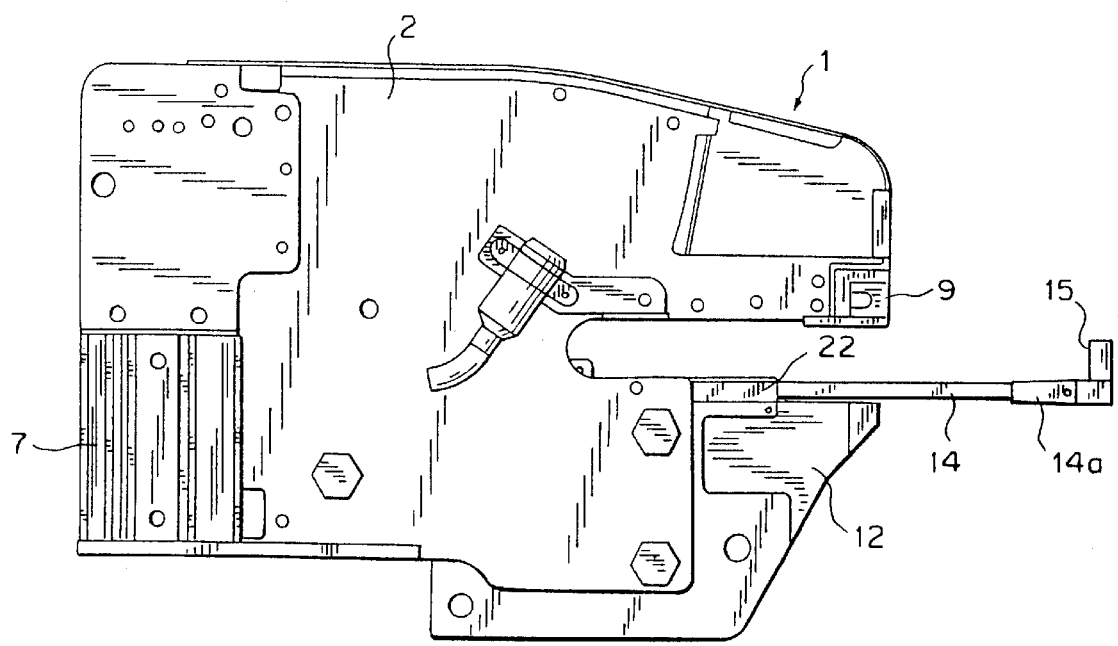

The active end of punch 8 faces a window or notch 11 formed onto both plates 2 and a support 12 is located below window 11 between plates 2 to which it is secured by means of screws 13. Support 12 is provided with a guide 22, inside which a rod or carriage 14 is slidingly mounted. Carriage 14 bears a turret anvil 15 that, at an end-of-stroke position of carriage 14, shown in FIG. 3, is axially aligned to the punch 8. This position of the carriage, when it is fully inserted between press plates 2, corresponds to the working position of the press itself, whereas the position shown in FIG. 4, where the carriage is fully extracted, corresponds to the press loading position. In particular, the free end of carriage 14 consists of a removable member 14a onto which the seat housing turret anvil 15 is formed.

Window 11 formed onto the two plates 2 is wide enough to allow the passage of the thickness of the rolled section to be processed and the sliding of carriage 14 with relative turret anvil 15.

A second lever 23 is located behind punch 8, straddled on lever 4 and pivoted with an end thereof to plates 2 below lever 4. In particular, second lever 23 consists of two parallel members 24a and 24b located at both sides of lever 4, connected at the respective ends thereof to a fulcrum 25 and joined by a plate 26 at the other respective ends thereof. From an intermediate position of parallel member 24a, b two flanges 23a extend along the sides of lever 4, their free ends abutting on head 8a of punch 8. A rod 27 of an actuator 28 abuts on plate 26, letting the lever 23 perform an angular motion sufficient to let punch 8 perform a slight sliding, with the function that will be disclosed hereinafter. Actuator 28 is controlled through a switch 29, operated by carriage 14 with an adjustable end 14b thereof when it reaches its working position. The angular motion of lever 4 is frontally restricted by the abutment against a spacer 3.

The upper side of the press is closed by a cover 30 engaging between two plates 2. Sideways, two buttons 31 are secured to plates 2 for operating the press by a pressure exerted on at least one of them.

Figure 5:
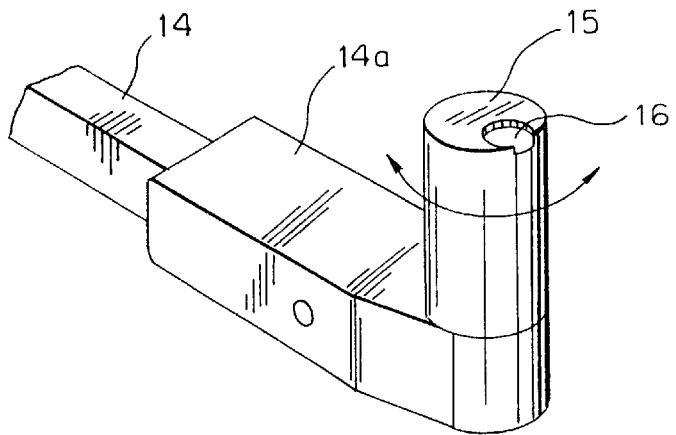
FIG. 5 is a top plan view of the carriage bearing the turret anvil of which the press according to the invention is provided.

As is also shown in FIG. 5, turret anvil 15 has one or more eccentric recesses 16 for housing the inserts that are to be installed in the rolled sections, and is secured to carriage 14 by broaching or elastic forcing. Recesses 16 are sized so as to let protrude therefrom only the insert portion (spigot) that is to be driven in the rolled section. Turret anvil 15 can be displaced angularly within the seat formed onto the removable end 14a to allow the positioning of the insert in the most convenient position for the installation thereof, and it is replaceable with other turret anvils provided with recesses of sizes suiting those of the inserts, and with suitable shapes for the functions that are to be carried out. Support 12 is also replaceable, operating on screws 13, with other supports differently shaped to suit different working conditions. For the same purposes, removable member 14a of carriage 14 and punch 8 are also replaceable.

Advantageously, besides fulcrum seat 17, lever 4 has other pivot seats, only one of which is shown in FIG. 2 and indicated with 18, aligned to corresponding seats, not shown, formed on plates 2. By means of the fulcrum seats 17, 18 lever 4 can be pivoted onto fulcrums of different force ratios, in order to obtain the best modulation of the forces required to install inserts of different sizes or onto different metals. When lever 4 pivots on 18, the stroke thereof is restricted by a spacer 3, against which the lever abuts with a projection 4c. When instead the lever pivots on 17, the stroke thereof is restricted by the working stroke of piston 7. These restrictions entail a maximum stroke of punch 8, anyhow not exceeding the maximum values foreseen by the current safety norms.

The press according to the invention works as follows.

Prior to a machining a configuration of the machine is required by assembling support 12 for carriage 14 and the carriage itself in the shape, among the available ones, best suited to the shapes of the workpieces to be processed. After the installation of a suitable support and of the relative carriage, punches and turret anvils need to be selected for the required functions. For instance, the press can be equipped with an insert driving punch or a blanking punch with the relative turret anvil, in this case working as countermatrix, or suitable drawing, forming, riveting or clinching punches.

When the press has been configured and tooled, the adjustment and optimization of the working parameters is carried out. This consists in the adjustment of the manifold pressure of the compressed air (or other operating fluid) and in the selection of the fulcrum of lever 4 for thrusting the punch, in order to obtain the most suitable thrust set on the punch, speed of descent and cost-effectiveness in the operating fluid consumption. Now the press can be used for the selected function.

Assuming the selected function to be the insert installation one, considered as the main function of the press, the operator prepares for work, checking the correctness of the punch and turret anvil installation, of the lever fulcrum position, of the manifold pressure values of the operating fluid, and facing the press in the correct position. Then extracts carriage 14 and loads turret anvil 15 with the selected insert. Then positions the rolled section, centering the hole in which the insert is to be installed with its spigot, that protrudes from the turret anvil. Holding with one hand the rolled section in an appropriate position, pushes the movable carriage into its working position, this operation being made easy by the fact that the insert drags the rolled section, as it is inserted into the turret anvil at one end and into the rolled section at the other end. When the carriage reaches the working position, second lever 23 is activated to bring the punch into abutment against the workpiece so as to exert thereon a limited pressure sufficient to lock it in the insert install position. This locking action prevents the workpiece from shifting during the punching, what might clamp the operator fingers against support 12. Now the operator, while holding the workpiece with one hand operates one of the two buttons 31 with the other hand, activating piston 7 that, through lever 4, pushes punch 8 against the workpiece. Once the action of lever 4 has ended, the punch moves upwards and the operator extracts the carriage, disengaging the rolled section from the turret anvil, that therefore becomes ready to be recharged for a new cycle.

Figure 7:
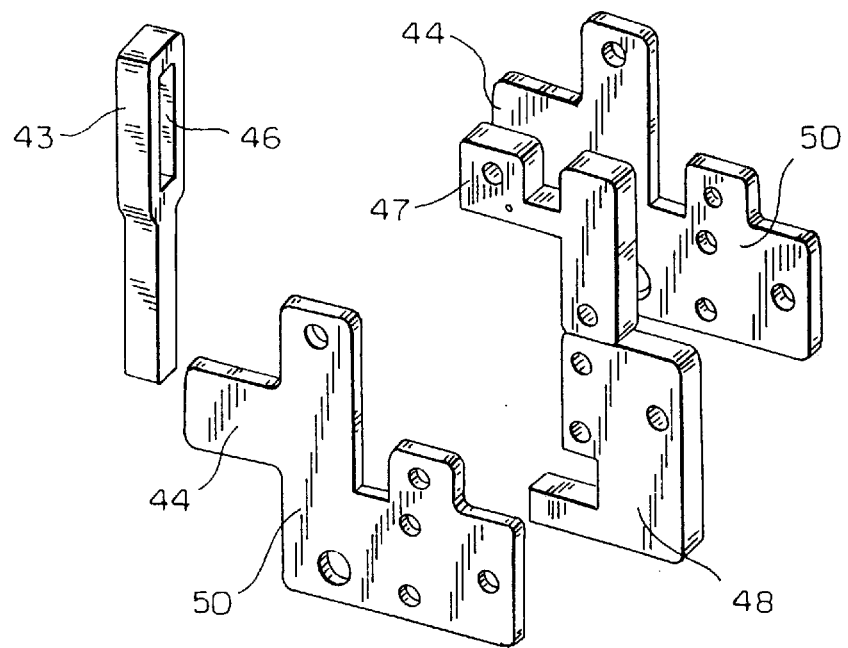
FIG. 7 is an exploded view of the attachment of FIG. 6.

To install inserts on rolled sections of particular or complex shapes, the press according to the invention can be equipped with specific tools. For instance, rolled sections of a generically C-shaped form (as the one shown in FIG. 6 and indicated with P1) cannot usually be machined with the above-mentioned press, because their size interferes with support 12 of carriage 14. To machine such workpieces, the press can be equipped with the attachment shown in FIGS. 6 and 7. Substantially, it allows to move the installation spot of the insert to a level lower than support 12. To this end, the attachment indicated with 40 comprises a body 41 engaging onto the end of carriage 14 and a slideway 42 inside which a rod 43 is slidingly mounted. The body 41 has two ends 44 engaging in corresponding seats 45 formed on both sides of support 12 in order to center rod 43 in axial alignment with punch 8 in the working position. As shown in FIG. 7, rod 43 has a slot portion 46 with which an arm 47 engages, integral with body 41, working as a guide and a rest. An L-shaped member 48 extends from body 41 under rod 43 working as a rest for the insert and as a bearing for the portion of rolled section onto which the insert is to be installed.

An embodiment of the above-disclosed attachment particularly advantageous for its ease of disassembly is the one shown as an exploded view in FIG. 7, in which body 41 consists of two plates 50, between which arm 47 and L-shaped member 48 are located, the whole assembly being held together by screws, not shown. Plates 50 are shaped so as to delimit, in combination with arm 47, the slideway 42 in which rod 43 slides. In this case, the force exerted by punch 8 is discharged on arm 47 bearing on support 12 and on plates 50 engaged onto support 12. Rod 43 can freely slide inside slideway 42 and it is manually lifted to access turret anvil 48, and then lowered again, holding it pressed on the workpiece while the carriage is pushed in the working position.

Figure 8:
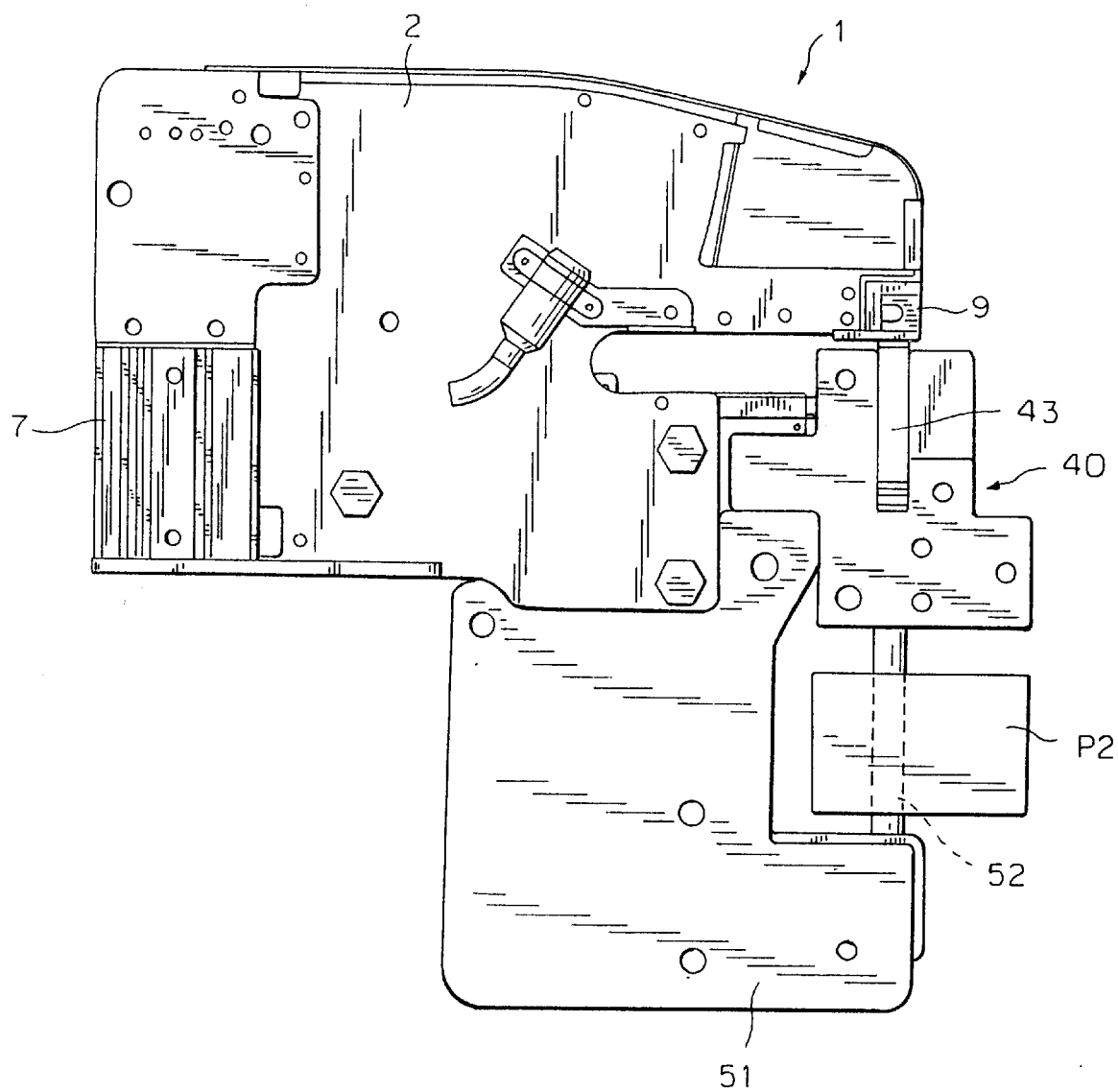
FIG. 8 is a side view of the insert press according to the invention, provided with a further attachment for installing inserts onto box-shaped workpieces.

To install inserts onto box-shaped workpieces, like that indicated with P2 in FIG. 8, it is possible to use the above disclosed attachment, suitably modified. In particular, an arm 51 bearing a turret anvil 52 of elongated shape is installed at the plates 2 of the press aligned to the punch 8 onto which the workpiece bottom is made to rest. In this case, the aforesaid attachment lacks the L-shaped member 48, and the rod 43 is supported by a spring, not shown, so as to avoid scraping on the workpiece that is held in place on the turret anvil during the steps while the carriage moves. All the forces discharge onto support 12.

In both above-mentioned variants rod 43 works as an extension of punch 8, i.e. punch 8 exerts the required installation pressure of the insert through this rod.

The insert press according to the present invention fully attains its objects.

The adoption of a movable carriage for the turret anvil enables to carry out loading steps outside of the press head, and therefore the distance between the punch and the turret anvil can be reduced until making impossible the insertion of a hand or arm therebetween. Further, the loading steps are facilitated, even in presence of peculiar shapes, as they can be carried out in a free zone, far enough from the press head to allow maximum freedom of movement to the operator, and total visibility of the worksite.

The possibility of mounting onto the press head punches and turret anvils destined to various uses (installation of threaded inserts, blanking or shearing, drawing, forming, riveting and clinching), together with the possibility of replacing the carriage support and the carriage itself, provides a high versatility to the press that, on one hand greatly increases its possible uses, allowing on the other hand the adoption of a wide range of configurations, each one meeting specific operative requirements.

Moreover, it is possible to easily access otherwise impracticable insertion positions. The possibility of angularly displacing the turret anvil, combined with the fact that the punch can also exert its pressure eccentrically with respect to its own axis, allows to attain the insert position which is most favorable for the positioning of the rolled section, that might even have complex shapes. Finally, the operative parameters can be optimized thanks to the possibility of pivoting the thrust lever of the punch onto different spots, thereby obtaining the best ratio among maximum thrust exerted by the punch against the turret anvil, speed of descent of the punch and operating fluid consumption.

Variations and/or modifications may be brought to the insert press according to the present invention, without departing from the scope of the invention itself, as defined by the annexed claims.

What is claimed is:

1. A press for the installation of inserts onto thin metallic or plastic rolled sections by cold plastic deformation of said rolled sections, comprising a structure (2,3) bearing a punch (8) and an insert-bearing turret anvil (15), arranged in a substantially axial alignment in a working position thereof, and actuator means (4,6,7) within said structure for controlling the sliding of said punch towards said turret anvil, characterized in that said turret anvil is mounted on a carriage (14) sliding with respect to said structure between said working position, wherein said carriage is completely inserted in said structure, and a loading position, wherein said carriage protrudes therefrom, a port between said punch and said turret anvil being wide enough to allow the insertion therebetween of said thin metallic or plastic rolled sections.

2. The press according to claim 1, wherein the turret anvil has at least one eccentric housing (16) for a insert, and pivots about its axis to position the insert in the position most suited for the installation thereof, said punch (8) also developing its pressing action eccentrically with respect to the axis thereof.

3. The press according to claim 1, where said carriage is removably mounted on said structure.

4. The press according to claim 3, where said carriage (14) is removably mounted on a support (12) that in turn is removably mounted on said structure (2,3).

5. The press according to claim 1, where said turret anvil (15) and said punch (8) are replaceable to suit the shape and size of the inserts to be installed, or to carry out different processes, like blanking, drawing, forming, riveting and clinching.

6. The press according to claim 1, wherein said actuator means comprise a lever (4) pivoted on said structure, cooperating with piston means (6,7) at one end (4*a*) and with said punch (8) at the other end (4*b*).

7. The press according to claim 6, wherein on said punch (8) a second lever (23) operates, for bringing the punch into abutment with said rolled section when said carriage (14) reaches said working position, so that said rolled section is locked onto said carriage (14).

8. The press according to claim 6, wherein said lever has several pivoting seats (17,18) aligned to corresponding engagement seats for the pin (5) thereof, inside which said pin (5)is alternatively engaged.

9. The press according to claim 1, wherein at the end of said carriage and in place of said turret anvil (15) a body (41) is assembled, inside which a sliding rod is mounted (43), insert bearing means (48,51) being provided under said rod, said body being slidingly anchorable to said support (12) for aligning said rod (43) to said punch (8) in said working position.

10. The press according to claim 9, wherein said insert bearing means (48) are integral to said body and comprise an arm extending below said rod (43) acting as a support for an insert aligned to said rod.

11. The press according to claim 9, wherein said insert bearing means (51) are integral to said support (12) and comprise an arm extending below said rod (43) bearing a turret anvil (52) aligned to said rod (43) in said working position.

* * * * *